US005547739A

United States Patent [19]

Ito et al.

[11] Patent Number: 5,547,739
[45] Date of Patent: Aug. 20, 1996

[54] RECORDING MEDIUM FOR HEAT SENSITIVE TRANSFER PRINTING

[75] Inventors: Kengo Ito; Yoshio Fujiwara, both of Kanagawa, Japan

[73] Assignee: Sony Corporation, Tokyo, Japan

[21] Appl. No.: 316,607

[22] Filed: Sep. 30, 1994

Related U.S. Application Data

[63] Continuation-in-part of Ser. No. 90,733, Jul. 13, 1993, abandoned.

[30] Foreign Application Priority Data

Jul. 14, 1992 [JP] Japan .................... 4-210782

[51] Int. Cl.$^6$ ................ B32B 5/16; B32B 27/34
[52] U.S. Cl. ............ 428/207; 428/195; 428/474.4; 428/475.2; 428/488.4; 428/913; 428/914; 525/389; 525/420
[58] Field of Search ................... 428/195, 201, 428/204, 207, 488.34, 913, 914, 474.4, 475.2; 525/389, 420

[56] References Cited

U.S. PATENT DOCUMENTS

| | | | |
|---|---|---|---|
| 3,354,121 | 11/1967 | Knoth, Jr. et al. | 260/47 |
| 3,405,076 | 10/1968 | Green et al. | 260/2 |
| 3,459,251 | 8/1969 | Kibler | 152/330 |
| 4,559,273 | 12/1985 | Kutsukake et al. | 428/484 |
| 4,592,951 | 6/1986 | Viola | 428/323 |
| 4,666,320 | 5/1987 | Kobayashi et al. | 400/241.1 |
| 5,326,635 | 7/1994 | Koyama | 428/323 |

FOREIGN PATENT DOCUMENTS 63-37130  2/1988  Japan .

Primary Examiner—Marion E. McCamish
Assistant Examiner—Blaine R. Copenheaver
Attorney, Agent, or Firm—Hill, Steadman & Simpson

[57] ABSTRACT

The present invention relates to an adhesive composition utilized to adhere an ink layer to a first substrate of a recording medium used for heat-sensitive transfer printing. The adhesive composition comprises polyamide and organo boron polymer. The organo boron polymer is a polyester which includes acidic chelate complex residue by reaction of polyol and boric acid. The adhesive composition provides a sufficient adhesive force between the ink layer and the first substrate of the recording medium such that the ink layer does not peel off from the first substrate and stick to a dye acceptor layer of a second substrate during the heat-sensitive transfer printing process.

6 Claims, 1 Drawing Sheet

RECORDING MEDIUM FOR HEAT SENSITIVE TRANSFER PRINTING

This application is a continuation-in-part of U.S. Ser. No. 08/090,733, now abandoned, filed Jul. 13, 1993 entitled "Adhesive Composition and Recording Medium For Heat Sensitive Transfer Printing" which is hereby incorporated by reference.

FIELD OF THE INVENTION

This invention relates to an adhesive composition for adhering an ink layer to a substrate of a recording medium for heat-sensitive transfer printing and more particularly, to an adhesive composition having high adhesiveness without a hardening agent.

BACKGROUND OF THE INVENTION

Personal computers, word processors and video printers are widely used devices many of which utilize heat-sensitive transfer printing as a technique for obtaining a hard copy of a document.

A typical recording medium 10 for heat-sensitive transfer printing is shown in FIG. 1. The recording medium 10 includes a first substrate 20 such as a polyester film. An ink layer 30 is formed on one side of the first substrate 20. The ink layer 30 includes a dye such as a heat-sublimate dye or a heat-melt dye and a binder resin for holding the dye. The ink layer 30 is adhered to the first substrate 20 by an adhesive layer 40. A heat-resistant and lubricant layer 50 is formed on an opposite side of the first substrate 20. The heat-resistant and lubricant layer 50 serves to prevent or substantially reduce sticking of the recording medium 10 when the recording medium 10 is placed in contact with a thermal head (not shown) and to enable smooth running of the recording medium.

A typical method for heat-sensitive transfer printing on a second substrate (not shown) having a dye-acceptor layer is as follows. The ink layer 30 which includes a dye is placed in contact with the dye-acceptor of the second substrate. A thermal-head is then utilized which provides heat to the heat-resistant and lubricant layer 50 in accordance with predetermined image information. The heat provided by the thermal head then causes the dye from the ink layer 30 to be transferred to the dye-acceptor layer to form an image.

It is common to use polyurethane cross-linked by a hardening agent containing di-isocyanate as an adhesive composition utilized to form the adhesive layer 40. The reason is that polyurethane adhesive composition adheres to the polyester film used as a substrate.

However, the use of such a polyurethane adhesive composition has disadvantages. A disadvantage is that the polyurethane adhesive composition provides an insufficient adhesive force between the ink layer 30 and the first substrate 20 for heat-sensitive transfer printing. Consequently, the ink layer 30 peels off from the first substrate 20 during the heat-sensitive transfer printing process and sticks to the dye-acceptor layer of the second substrate. Another disadvantage is that the polyurethane adhesive composition has a relatively short pot life (about 12 hours) which hinders the manufacturing process and is not convenient to handle.

SUMMARY OF THE INVENTION

According to one aspect of this invention, there is provided a recording medium for heat-sensitive transfer printing having a first substrate, an adhesive composition layer and an ink layer, wherein the adhesive composition layer includes polyamide and organo boron polymer.

An object of the present invention is to provide a recording medium for heat-sensitive transfer printing wherein the recording medium includes an ink layer which is adhered to the first substrate by the adhesive composition layer with sufficient adhesive force wherein the ink layer does not peel off from the first substrate and stick to a dye-acceptor layer of a second substrate during the heat-sensitive transfer printing process.

DETAILED DESCRIPTION OF THE INVENTION

Figure 1:
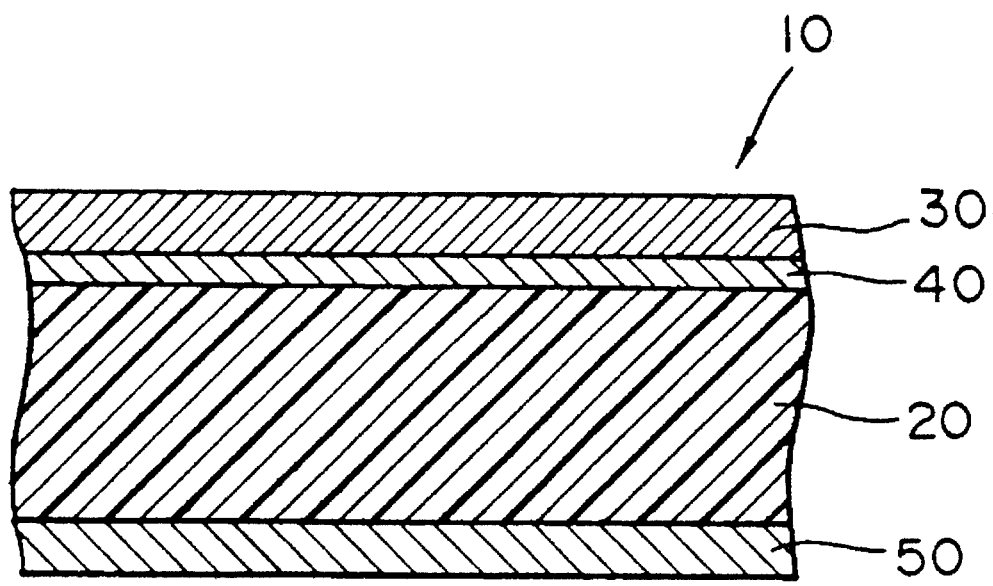
FIG. 1 is a sectional view showing of a recording medium for heat-sensitive transfer printing.

In accordance with the present invention, an adhesive composition for adhering an ink layer to a substrate of a recording medium for heat-sensitive transfer printing includes polyamide and organo boron polymer.

Organo boron polymer used in this invention has repeated semi-polar structures in one molecular, which are represented as chemical formula (1) shown below.

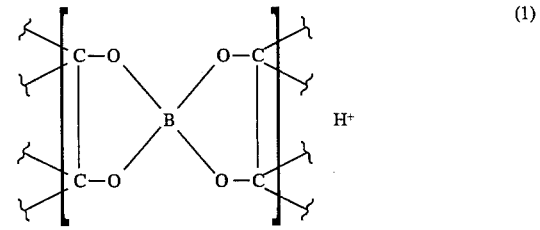

The semi-polar structure is produced as follows:

Reacting one mol, in total, of one or more compounds of general formula (2):

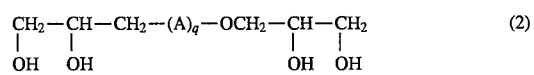

wherein q represents 0 or 1; and when q=1, A represents
—$(X)_1$—$(Y)_m$—$(Z)_n$—;

where X and Z each represent and oxygen-containing hydrocarbon group having one terminal ether residue and having 100 or fewer carbon atoms in total;

Y represents —O—CO—R—CO— (where R represents a hydrocarbon group having from 1 to 34 carbon atoms), or —OCO—NH—R'—NH—CO— (where R' represents a hydrocarbon group having from 2 to 13 carbon atoms);

1, m and n each represent 0 or 1, with one mol of boric acid or a tri-borate with a lower alcohol having 4 or fewer carbon atoms or with 0.5 mol of boric anhydride in order to triesterify the compound(s) of formula (2): or Polyetherifying one or more di(glycerin)=borates or diols each containing a di(glycerin)=borate residue in its intermediate moiety and having 206 or fewer carbon atoms in total (hereinafter referred to as predetermined boron-containing diols), or reacting one mol, in total, or one or more di(glycerin)=borates or predetermined boron-containing diols with one mol, in total, of one or more dicarboxylic acids each having from 3 to 36 carbon atoms (hereinafter referred to as predetermined dicarboxylic acids), or esters of predetermined dicarboxylic acids and lower alcohols each having 4 or fewer carbon atoms, or halides of predetermined dicarboxylic acids or diisocyanates each having from 4 to 15 carbon atoms (hereinafter referred to as predetermined diisocyanates).

The organo boron polymer used in this invention is represented as chemical formula (3) shown below including the semi-polar structures.

R in chemical formula (3) shown below shows residue other than carboxyl group of dicarboxylic acid, which is decided by a variety of dicarboxylic acid. R is tetramethylene residue when adipic acid is used as dicarboxylic acid.

$$\left\{ \left[ \begin{array}{c} CH_2-O \\ | \\ O-CH_2-CH-O \end{array} \begin{array}{c} \diagdown \\ B \\ \diagup \end{array} \begin{array}{c} O-CH- \\ | \\ O-CH_2 \end{array} \right] CH_2-O-OCRCO \right\}_p H^+ \quad (3)$$

R is 1,2- phenylene residue when phthalic acid is used as dicarboxylic acid.

R is 1,4- phenylene residue when terephthalic acid is used as dicarboxylic acid.

In accordance with the present invention, P ranges from 5 to 50. If P is less than 5, organo boron polymer represented by the chemical formula (3) becomes liquid resin having low viscosity properties. When the organo boron polymer having a P less than 5 is mixed with polyamide, the mixed adhesive composition develops high viscosity properties, in other words, becomes sticky at room temperature.

After the mixed adhesive composition is coated on one side of a film, an ink composition is coated on the mixed adhesive composition layer. But there may be some points where no ink composition is coated on the mixed adhesive composition layer. When the ink ribbon is rolled or reeled up, these points adhere to the other or back side of the film disadvantageously. Therefore, P may be not less than 5.

If P is greater than 50, organo boron polymer represented by the chemical formula (3) may not be solved in solvent such as alcohol and toluene. Further, the organo boron polymer having the number P greater than 50 is not mixed up with polyamide well without solvent. Therefore, P may not be greater than 50.

Polyamide used in this invention is selected from polyamide used for synthesized fiber and so on in accordance with the use condition of adhesive composition. For example, aliphatic polyamide such as nylon 6, nylon 6,6, diamine group such as ethylenediamine, diethylenetriamine, polyamide group derived from triamine group and dimer acid are exemplified.

Organo boron polymer is dissolved in solvent such as alcohol (ex. methanol, ethanol, etc.)DMF, THF. Polyamide soluble in the above solvent is preferable because it is easy to handle such a polyamide for preparing or painting adhesive composition. The proportion of polyamide and organo boron polymer is selected in accordance with a purpose. The adhesive composition of the present invention may be prepared by mixture of polyamide and organic boron polymer with solvent and stirred by a ball mill or similar device.

Referring to FIG. 1, the adhesive composition of the present invention is utilized to form an adhesive layer 40 used to adhere a first substrate 20 to an ink layer 30 of a recording medium 10 utilized for heat-sensitive transfer printing. In this application, it is preferable to mix less than 100 parts by weight of organo boron polymer per 100 parts by weight of polyamide for preventing the adhesive layer 40 from becoming sticky at room temperature. Furthermore, the recording medium 10 includes a heat-resistant and lubricant layer 50 which is formed on an opposite side of the first substrate 20.

Use of the adhesive composition as the adhesive layer 40 in accordance with the present invention provides a sufficient adherence between the ink layer 30 and the first substrate 20 such that the ink layer 30 does not peel off from the first substrate 20 and stick to the dye-acceptor layer of the second substrate during the heat-sensitive transfer printing process. In addition, this adhesive composition provides sufficient adhesive force at temperatures between approximately room temperature and 300° C. Furthermore, the adhesive layer 40 is substantially resistant to attack by a hydrocarbon solvent such as toluene or paraffin which is solvent in ink composition for the ink layer 30. Consequently, the adhesive force of the adhesive layer 40 does not substantially change after the ink layer 30 is formed on the adhesive layer 40. Furthermore, use of a recording medium fabricated in accordance with this invention allows the use of a conventional heat-sensitive transfer printing process as previously described.

In addition, mass production of the adhesive layer 40 is enhanced since clogging caused by the adhesive composition of equipment such as the etched roll of the gravure coater is substantially reduced.

The recording medium of this invention may be prepared by a conventional method. For instance, a method includes steps of painting the adhesive composition of this invention on the one side of the substrate, drying the adhesive composition, painting the ink composition mixed dye, binder resin and solvent on the adhesive layer, drying.

EXAMPLE 1

The following component was uniformly mixed by a ball mill and adhesive composition was prepared.
Adhesive Composition
Nylon (Nihom Rilsan K.K.; Trademark 1276TE) 5 parts by weight
Organo boron polymer 1 part by weight
(Boron International Inc.; Trademark Hi-Boron DLG-1100K)
Ethanol 50 parts by weight
Toluene 50 parts by weight
The prepared adhesive composition was kept at 30° C. for 10 days. At the end of this period, the properties of the adhesive composition did not substantially change and were stable.

EXAMPLE 2

The following component was uniformly mixed by a ball mill and adhesive composition was prepared.
Adhesive Composition
Nylon (Teikoku Chemical Industries Co. LTD; Trademark Torejin MF-30) 5 parts by weight
Organic boron polymer 3 parts by weight
(Boron International Inc.; Trademark Hi-Boron DLG-1100K)
Ethanol 90 parts by weight
MEK 10 parts by weight
The prepared adhesive composition was kept at 30° C. for 10 days. At the end of this period, the properties of the adhesive composition did not substantially change and were stable.

COMPARATIVE EXAMPLE 1

The following component was uniformly mixed by a ball mill and adhesive composition was prepared.

Adhesive Composition
Polyesterurethane 10 parts by weight
(Nippon Polyurethane Industry Co., LTD.; Trademark DN3870)
Hardening agent derived from three functional polyisocyanate 0.5 parts by weight
(Nippon Polyurethane Industry Co., LTD.; Trademark Koroneta L)
MEK 50 parts by weight
Toluene 50 parts by weight The prepared adhesive composition was uniformly mixed. The viscosity of the adhesive composition increased after the mixture. The adhesive composition became substantially gel-like after one day and as such it was substantially difficult to paint the adhesive composition.

EXAMPLE 3

The adhesive composition prepared in Example 1 was painted on the one side of polyethylene terephthalate film formed heat-resistant and lubricant layer on the other side by a gravure coater. The painting speed of the gravure coater was 20 m per minute. The thickness of the adhesive composition layer was 2 mm on wet conditions.

The adhesive composition layer was dried at the temperature of 110° C. in a hot-air drying chamber.

The following ink composition was painted on the adhesive composition layer and dried. The ink ribbon was prepared thereby. The etched roll of the gravure coater wasn't clogged with the adhesive composition at that time. The surface of the ink ribbon was in good condition.

Ink Composition
Ethyl hydroxy cellulose (Low) 10 parts by weight (Hercules Co.)
A known dye as shown by chemical formula (4) 3 parts by weight

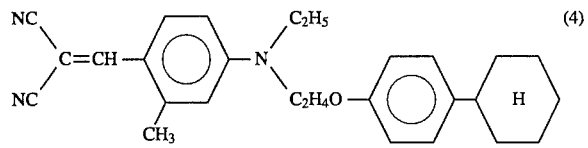

MEK 50 parts by weight
Toluene 50 parts by weight

The prepared ink ribbon was put to a color video printer (manufactured by Sony Corporation the assignee herein and designated as VPM-30STA) and step printing was done on the sheet having a dye-acceptor layer. A clear image was obtained without ink layers sticking to the sheet having a dye-acceptor layer.

The adhesive composition of example 1 kept at the temperature of 30° C. for 10 days was used for preparing an ink ribbon in the same manner. The obtained ink ribbon had the same ability as the obvious ink ribbon.

EXAMPLE 4

The ink ribbon was prepared in the same manner as example 3 except for using the adhesive composition of Example 2. The etched roll of the gravure coater was not clogged with the adhesive composition at that time. The surface of the ink ribbon was in good condition.

The step printing was done on the sheet having a dye-acceptor layer in the same manner as Example 3. A clear image was obtained without ink layers sticking to the sheet having a dye-acceptor layer.

The adhesive composition of Example 2 kept at the temperature of 30° C. for 10 days was used for preparing an ink ribbon in the same manner. The obtained ink ribbon had the same ability as the obvious ink ribbon.

COMPARATIVE EXAMPLE 2

The ink ribbon was prepared in the same manner as Example 3 except for using the adhesive composition of comparative Example 1. Defects and non-uniformity appeared on the surface of the ink layer when the ink ribbon was prepared about 2 or $3 \times 10^2$ m.

Mottling appeared on the surface of the ink layer when the ink ribbon was prepared about $1 \times 10^4$ m. The etched roll of the gravure coater was clogged with finely divided resin.

While this invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as falling within the scope of the appended claims.

What is claimed is:

1. An ink sheet for use in heat-sensitive transfer printing comprising:

a substrate having a surface;

an adhesive layer disposed on the surface, the adhesive layer being formed from a composition comprising: about 100 parts by weight of a polar organic solvent soluble polyamide and greater than zero and about 100 parts by weight per 100 parts by weight of said polyamide of an organo boron polymer having repeating units of the formula:

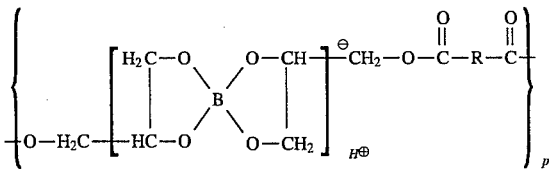

wherein

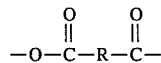

is a residue of a dicarboxylic acid and p is from about 5 to about 50; and an ink layer disposed on said adhesive layer.

2. An ink sheet as defined in claim 1, wherein said polyamide is soluble in a polar organic solvent selected from the group consisting of methanol, ethanol, dimethyl formamide (DMF) and tetrahydrofuran(THF).

3. An ink sheet as defined in claim 1, wherein said polyamide is selected from nylon 6 and nylon 6,6.

4. An ink sheet as defined in claim 1, further comprising a heat-resistant lubricating layer disposed on a surface of the substrate opposite the adhesive layer.

5. An ink sheet as defined in claim 1, wherein said adhesive layer is resistant to attack by a hydrocarbon solvent.

6. An ink sheet as defined in claim 1, wherein said substrate is a polyethylene terephthalate film.

* * * * *